United States Patent
Sunderland

(10) Patent No.: US 12,044,358 B2
(45) Date of Patent: Jul. 23, 2024

(54) COMPRESSED-GAS LUBRICATION SYSTEM

(71) Applicant: Bruce Wayne Sunderland, Harleysville, PA (US)

(72) Inventor: Bruce Wayne Sunderland, Harleysville, PA (US)

(*) Notice: Subject to any disclaimer, the term of this patent is extended or adjusted under 35 U.S.C. 154(b) by 0 days.

(21) Appl. No.: 18/027,327

(22) PCT Filed: Sep. 21, 2021

(86) PCT No.: PCT/US2021/051386
§ 371 (c)(1),
(2) Date: Mar. 20, 2023

(87) PCT Pub. No.: WO2022/061316
PCT Pub. Date: Mar. 24, 2022

(65) Prior Publication Data
US 2023/0341086 A1    Oct. 26, 2023

Related U.S. Application Data

(60) Provisional application No. 63/204,241, filed on Sep. 21, 2020.

(51) Int. Cl.
*F16N 7/34* (2006.01)
*F16N 29/02* (2006.01)

(52) U.S. Cl.
CPC .............. *F16N 7/34* (2013.01); *F16N 29/02* (2013.01); *F16N 2250/04* (2013.01); *F16N 2270/72* (2013.01); *F16N 2280/02* (2013.01)

(58) Field of Classification Search
CPC . F16N 7/34; F16N 17/06; F16N 29/02; F16N 7/30; F16N 2250/04; F16N 2270/72; F16N 2280/02

(Continued)

(56) References Cited

U.S. PATENT DOCUMENTS 4,690,249 A * 9/1987 Olson, Jr. ............... F16N 27/00
                                                            184/6.4
4,848,989 A * 7/1989 Maeda ................... B01D 46/30
                                                            55/482

(Continued)

FOREIGN PATENT DOCUMENTS

FR     2319465 A1   2/1977
GB     1085292 A    9/1967

OTHER PUBLICATIONS

International Search Report and Written Opinion dated Dec. 9, 2021 in International Application No. PCT/US2021/051386.

*Primary Examiner* — Michael R Mansen
*Assistant Examiner* — Mark K Buse
(74) *Attorney, Agent, or Firm* — Panitch Schwarze Belisario & Nadel LLP

(57) ABSTRACT

A lubrication system for pneumatic machinery includes a lubricant vessel and a lubricant-control valve connected to a drop-dispensing body to discharge a demanded drop of lubricant inside a sealable drip chamber, which has a pressurized-gas inlet and a lubricated-gas outlet. A lubricator-pad assembly includes a lubricator-pad holder securing a lubricator pad to receive the drop of lubricant. Pressurized gas flows through the holder when exiting the drip chamber. A drop detector detects the demanded drop of lubricant. A controller connects to the drop detector and receives an indication that the demanded drop of lubricant has been detected. When a lubrication-demand tracker of the controller determines, based upon time or flow measurement or a combination thereof, that a lubrication threshold is reached, the controller initiates a drop cycle. If a maximum drop time passes before the demanded drop of lubricant is detected, the controller activates a missing-drop cycle.

14 Claims, 7 Drawing Sheets

(58) Field of Classification Search
USPC .......................................................... 184/55.2
See application file for complete search history.

(56) References Cited

U.S. PATENT DOCUMENTS

| | | | | |
|---|---|---|---|---|
| 5,653,310 | A * | 8/1997 | Young | F16N 7/34 |
| | | | | 261/78.1 |
| 6,832,620 | B2 * | 12/2004 | Jaeger | F16N 13/02 |
| | | | | 417/63 |
| 2006/0060425 | A1 * | 3/2006 | Richardson | F16N 7/34 |
| | | | | 184/55.1 |
| 2018/0017211 | A1 * | 1/2018 | Divisi | G01N 33/2894 |

* cited by examiner

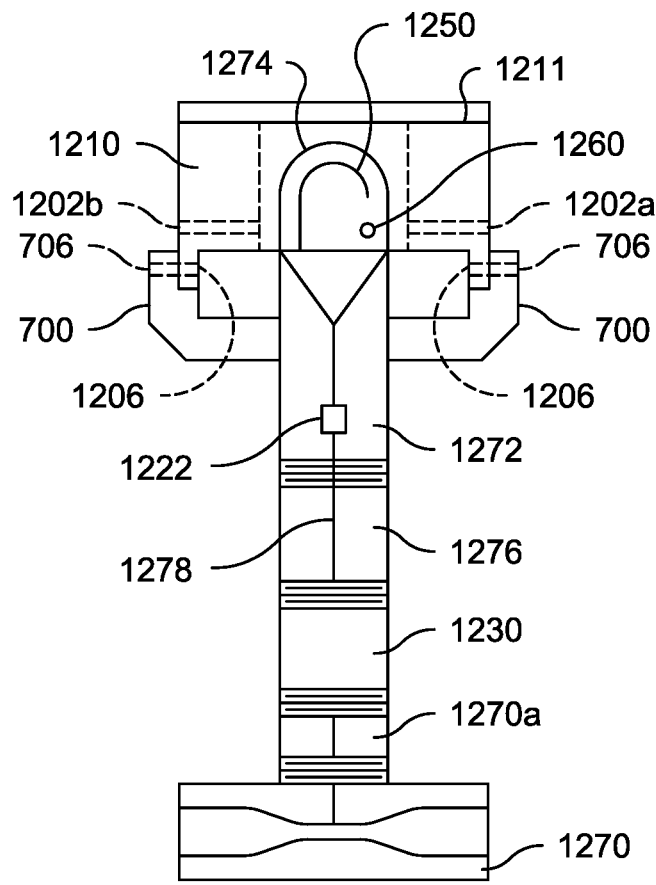
*Fig. 3A*
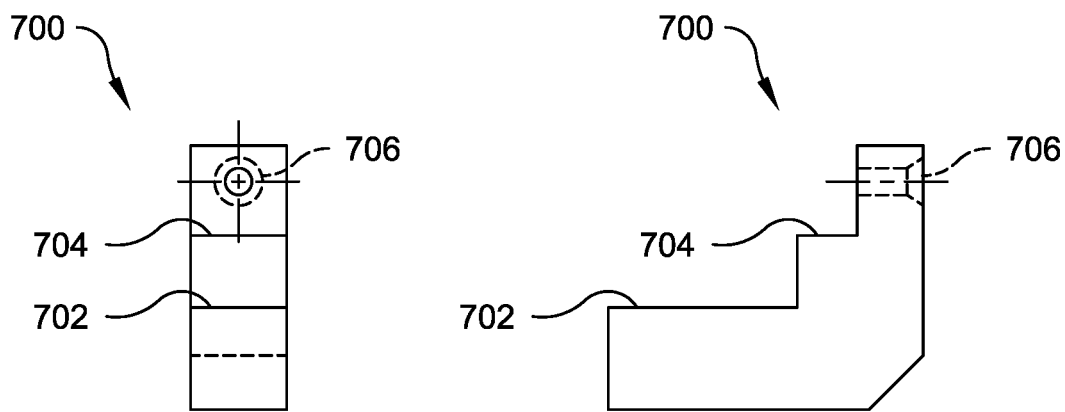
*Fig. 3B*  *Fig. 3C*

COMPRESSED-GAS LUBRICATION SYSTEM

CROSS-REFERENCE TO RELATED APPLICATIONS

This application is a Section 371 of International Application No. PCT/US2021/051386, filed Sep. 21, 2021, which was published on Mar. 24, 2022 under International Publication No. WO 2022/061316, which claims priority from U.S. Provisional Patent Application No. 63/204,241, filed Sep. 21, 2020. The entire disclosure of each application cited in this paragraph is incorporated by reference.

BACKGROUND OF THE DISCLOSURE

1. Field of the Disclosure

The present disclosure relates generally to pneumatically driven tools and machinery, and more particularly to a lubrication system for introducing a lubricant such as oil into a flow of compressed air or other compressed gas, the flow of compressed air or other compressed gas being used to power a pneumatic tool or other pneumatic machinery.

2. Background

Pneumatic tools and other pneumatic machines are powered by a source of compressed gas. The compressed gas is typically used to drive pistons, air motors, or other components. The pneumatic machines benefit from lubrication: the pneumatic machines are more efficient, durable, and reliable when a lubricant is introduced into the compressed gas. Many pneumatic system components and almost all pneumatic tools perform better when lubricant is introduced into the compressed gas. Injecting a lubricant mist into the compressed gas continuously lubricates valves, cylinders, and air motors for proper operation and long service life. The lubricant is introduced into the compressed gas at very low concentrations (for example, below 4.32 parts per million of lubricant in the compressed gas, computed by mass of lubricant per mass of compressed gas), with small droplets or vapor of the lubricant being carried by the compressed gas through the cylinders, valves, air solenoids, air motors, and other machine components that come in contact with the compressed gas.

Various devices have been developed for introducing lubricant into the compressed gas that powers such pneumatic machines. Certain of these devices include a lubricant reservoir or vessel and are intended to deliver small quantities of lubricant into a flow of compressed gas over an extended period of time, with periodic refilling of the reservoir with a lubricant such as oil. Referring to FIG. 1, one prior device 10 for this purpose comprises an oil reservoir 12, a compressed-gas inlet 14, a compressed-gas outlet 16, an oil-drip tube 18, a restricted passage 20 between the inlet and the outlet, and an oil-drip passage 22 that joins the restricted passage between the inlet and the outlet. Compressed gas is introduced into the oil reservoir, and oil 24 is driven through the oil-drip tube. Oil drops fall from the oil-drip tube and flow through the oil-drop passage. The oil drops are mixed with the compressed gas, which moves at relatively high velocity due to the presence of the restricted passage. The prior device is configured to attempt to provide oil at a selected rate and may include an adjustable valve 26 between the oil reservoir and the oil-drip tube in an attempt to provide control over the rate at which the oil is delivered to the compressed gas, and thus over the rate at which the oil is consumed.

Lubrication systems according to the present disclosure provide features and advantages not found in prior devices, including the prior device of FIG. 1.

SUMMARY OF THE DISCLOSURE

Briefly stated, an example of a lubrication system for pneumatic machinery comprises a sealable lubricant vessel having a lubricant outlet. The sealable lubricant vessel is operatively connected to at least one pressurizing valve passage operable to admit pressurized gas into the sealable lubricant vessel and to block pressurized gas from passing into the sealable lubricant vessel. The sealable lubricant vessel is operatively connected to at least one depressurizing valve passage operable to release pressurized gas from the sealable lubricant vessel. A drop-dispensing body is fluidly connected to the lubricant outlet and has a drop-discharge orifice. The drop-dispensing body is configured to discharge a demanded drop of lubricant within a selected drip time. A sealable drip chamber comprises a drip-chamber base, a cover portion sealingly attached to the drip-chamber base, a pressurized-gas inlet within the sealable drip chamber for admitting pressurized gas into the sealable drip chamber, and a lubricated-gas outlet permitting lubricated pressurized gas to flow from within the sealable drip chamber to outside of the sealable drip chamber. A lubricator-pad assembly comprises a lubricator-pad holder and a lubricator pad secured by the lubricator-pad holder. The lubricator-pad holder has a first lubricator-pad orifice and a second lubricator-pad orifice providing a gas-flow path through the lubricator-pad holder. The lubricator-pad holder is positioned between the pressurized-gas inlet and the lubricated-gas outlet such that pressurized gas flows from the pressurized-gas inlet through the first lubricator-pad orifice and through the second lubricator-pad orifice when exiting the sealable drip chamber through the lubricated-gas outlet. The drop-discharge orifice of the drop-dispensing body is disposed within the sealable drip chamber, and the lubricator-pad assembly is disposed to receive the demanded drop of lubricant discharged from the discharge orifice. A drop detector is configured to detect the demanded drop of lubricant from the drop-discharge orifice. A lubricant-control valve is disposed between the sealable lubricant vessel and the drop-discharge orifice and is controllable to block or permit flow between the sealable lubricant vessel and the drop-discharge orifice. An isolation valve is disposed to block or permit flow between a space within the sealable drip chamber and a space outside of the sealable drip chamber. A controller is operatively connected to the drop detector so that when the drop detector detects the demanded drop of lubricant, the controller receives an indication that the demanded drop of lubricant has been detected. The controller is operatively connected to the lubricant-control valve so that the controller controls opening and closing of the lubricant-control valve. The controller is operatively connected to the isolation valve so that the controller controls opening and closing of the isolation valve. The controller includes a lubrication-demand tracker. Upon the controller determining that the lubrication-demand tracker has reached a lubrication threshold, the controller initiates a drop cycle, wherein in the drop cycle the controller first causes the isolation valve to be closed for a settling time. The controller then causes the lubricant-control valve to permit flow until one of a first event and a second event occurs, wherein the first event is a detection of the demanded drop of lubricant by the drop detector, and the second event is a passage of a maximum drop time, the maximum drop time being greater than or equal to the selected drop time of the drop-dispensing body. If the passage of the maximum drop time is completed before the demanded drop of lubricant is detected, the controller activates a missing-drop cycle.

In any embodiment of the lubrication system, a single valve may comprise the at least one pressurizing valve passage and the at least one depressurizing valve passage operable to release gas pressure from the lubricant vessel.

In any embodiment of the lubrication system, the drop-dispensing body may comprise a valve fluidly connected to the lubricant outlet and to the drop-discharge orifice and adjustable to permit a drop of oil to be discharged from drop-dispensing body within the selected drip time upon opening of the lubricant-control valve.

In any embodiment of the lubrication system, a contoured surface of the sealable drip chamber may be configured to guide the demanded drop of lubricant to the lubricator-pad assembly. In any such embodiment of the lubrication system, the contoured surface of the sealable drip chamber may have a funnel shape.

In any embodiment of the lubrication system, the drop detector may comprise a light receiver and a light source detectable by the light receiver, wherein the drop detector detects the demanded drop of lubricant by detecting interruption of the light source.

In any embodiment of the lubrication system, if the demanded drop of lubricant is detected by the drop detector within the maximum drop time, a drop counter may be incremented, and the isolation valve may be closed.

In any embodiment of the lubrication system, the system may further comprise a gas-flow meter disposed to measure a measured flow characteristic of at least a portion of a flow of pressurized gas requiring lubrication. The controller may include a gas-flow tracker determining a cumulative quantity of the flow of pressurized gas requiring lubrication since a resetting of the gas-flow tracker. The cumulative quantity of the flow of pressurized gas requiring lubrication may be determined based on at least one of an elapsed time since the resetting of the gas-flow tracker and the measured flow characteristic. Upon the controller determining that the cumulative quantity of the flow of gas requiring lubrication has reached a lubrication threshold, the controller may execute a drop cycle.

In any embodiment of the lubrication system, upon the controller determining that the drop counter has reached a lubricant-refill threshold, the controller may activate a lubricant-refill indicator.

In any embodiment of the lubrication system, the system may further comprise a heater disposed to prevent ice formation within the sealable drip chamber.

In any embodiment of the lubrication system, the system may further comprise a flow-restriction valve operable to control a flow rate of pressurized gas entering into the sealable drip chamber through the pressurized-gas inlet.

In any embodiment of the lubrication system including a gas-flow meter, the gas-flow meter may comprise a metering tube comprising a substrate having a plurality of flow-carrying bores passing longitudinally therethrough, a dynamic pressure port with a dynamic-pressure inlet facing in an upstream direction, and a static-pressure port facing transversely with respect to the upstream direction. In any such embodiment of the lubrication system, the metering tube may comprise a flow-restricting body securable to restrict flow through at least one of the flow-carrying bores. In any such embodiment of the lubrication system, the flow-restricting body may be a set screw with an axial bore therethrough.

BRIEF DESCRIPTION OF THE DRAWINGS

The foregoing summary, as well as the following detailed description of examples of systems and devices according to the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings:

FIG. 3A is a schematic view of an example of a sealable drip vessel a sensor ring, and related components that can be used in a lubrication system of the type shown in FIG. 2;

FIG. 3B is a side elevational view of a clamp block according to the present disclosure, for use in a lubrication system of the type shown in FIG. 2, or with the components shown in FIG. 3A;

FIG. 3C is a front elevational view of the clamp block of FIG. 3B;

DETAILED DESCRIPTION OF THE INVENTION

Figure 1:
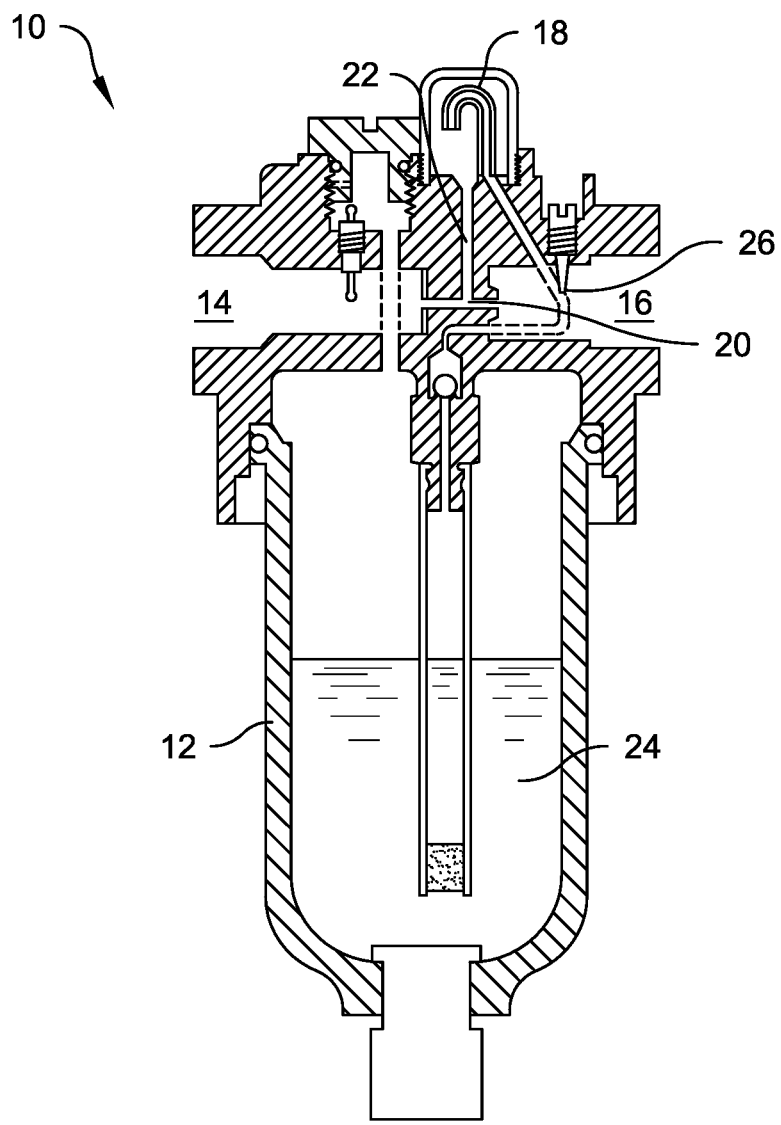
FIG. 1 is a schematic cross-sectional view of a lubrication system according to the prior art.

Certain terminology is used in the following description for convenience only and is not limiting. The words "right," "left," "lower," and "upper" designate directions in the drawings to which reference is made. The words "inner" and "outer" refer to directions toward and away from, respectively, the geometric center of an object and designated parts thereof. Unless specifically set forth otherwise herein, the terms "a," "an," and "the" are not limited to one element but instead should be read as meaning "at least one." "At least one" may occasionally be used for clarity or readability, but such use does not change the interpretation of "a," "an," and "the." Moreover, the singular includes the plural, and vice versa, unless the context clearly indicates otherwise. "Including" as used herein means "including but not limited to." The word "or" is inclusive, so that "A or B" encompasses A and B, A only, and B only. The terms "about," "approximately," "generally," "substantially," and like terms used herein, when referring to a dimension or characteristic of a component, indicate that the described dimension/ characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit thereof. The terminology set forth in this paragraph includes the words noted above, derivatives thereof and words of similar import.

Referring to FIGS. 2-7B, a lubrication system is disclosed. Alternative embodiments are disclosed for certain components thereof.

Figure 2:
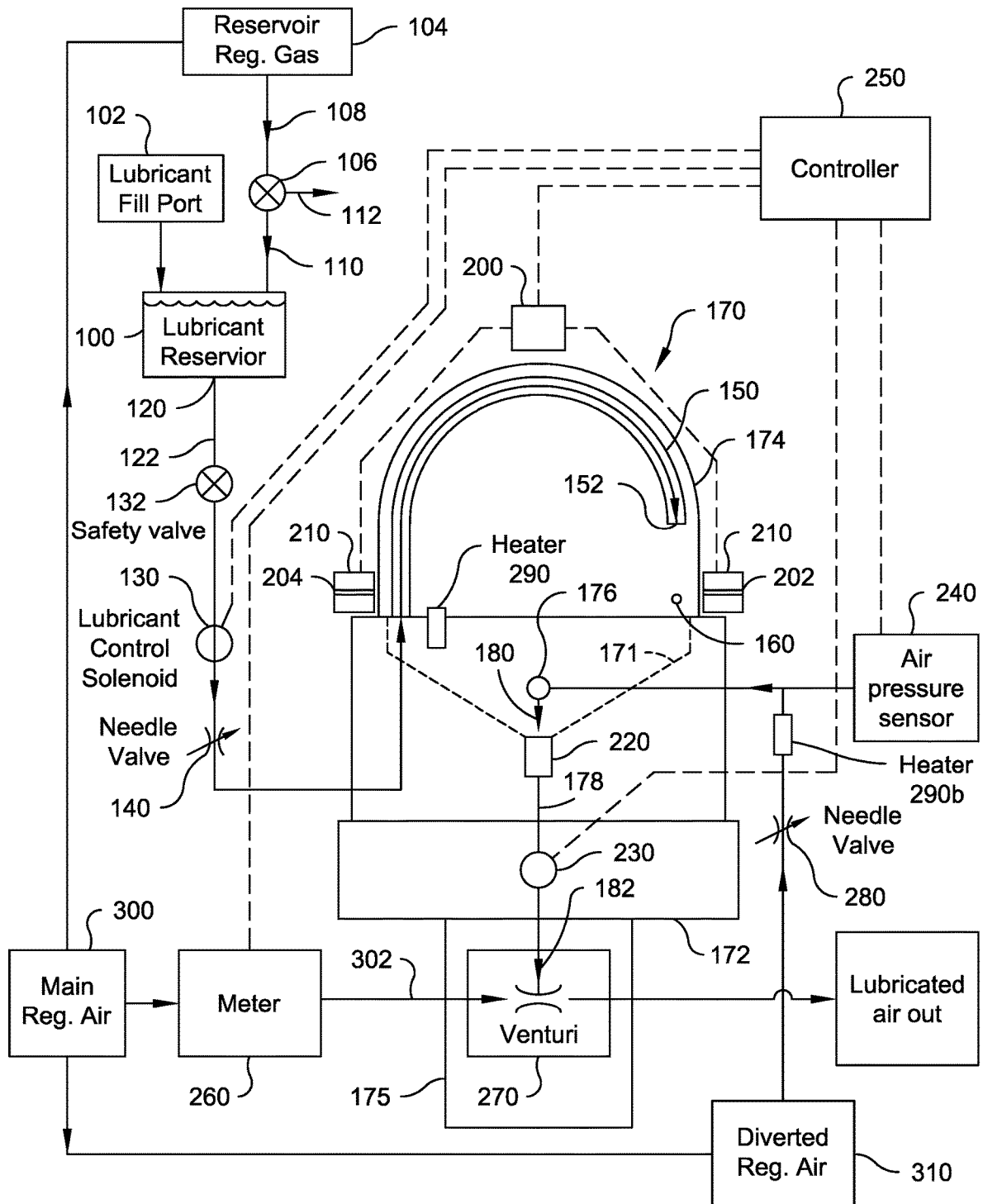
FIG. 2 is a schematic view of a lubrication system according to the present disclosure.

Referring to FIG. 2, the lubrication system may comprise a sealable lubricant vessel 100 having a lubricant-fill port 102, which may include a fine debris screen or a file filter of cloth or other material to prevent contamination of the lubricant, and a lubricant outlet 120. The sealable lubricant vessel 100 may be operatively connected to at least one pressurizing valve passage 108 operable to admit pressurized gas into the sealable lubricant vessel 100 and to block pressurized gas from passing into the sealable lubricant vessel 100. The sealable lubricant vessel 100 may be operatively connected to at least one depressurizing valve passage 112 operable to release pressurized gas from the sealable lubricant vessel 100. Depressurizing the lubricant vessel 100 may be necessary so that the lubricant vessel 100 may be refilled without having to depressurize the remainder of the system. A single valve 106 may comprise the at least one pressurizing valve passage 108 and the at least one depressurizing valve passage 112 operable to release gas pressure from the sealable lubricant vessel 100. An additional gas passage 110 may be disposed between the valve 106 the sealable lubricant vessel 100 and may provide a flow path for both admitting pressurized gas into the sealable lubricant vessel 100 and releasing pressurized gas from the sealable lubricant vessel 100. Compressed gas for admission to the sealable lubricant vessel 100 may be drawn from a source of compressed gas, such as a source of "regulated air." The source of compressed gas or regulated air may be a manifold 300, from which compressed gas (labeled "main regulated air" in FIG. 2) may be drawn via reservoir regulated gas source 104. In the embodiment shown in FIG. 2, the compressed gas source for the entire system is the manifold 300. This arrangement results in compressed gas of essentially equal pressure being provided to the lubricant reservoir 100, the "diverted regulated air" intake 310, and the principal stream 302, which flows through the meter 260 and the gas mixer/venturi 270. Lubricant is added to the gas flow passing through the diverted regulated air intake 310, which diverts a relatively small portion of the flow from the main regulated air manifold 300. A flow-restriction valve in the form of a needle valve 280 allows for adjustment of the flow through the diverted regulated air intake 310, which flow enters the sealable drip chamber 170 through the pressurized-inlet 176. In general, the purpose of the needle valve 280 is to adjust the flow gas flow passing through the diverted regulated air intake 310 to be as low as possible while providing an acceptable level of lubrication, to minimize the amount of lubricant consumed by the system, and to avoid over-lubrication.

Continuing to refer to FIG. 2, a drop-dispensing body 150 may be fluidly connected to the lubricant outlet 120, such as by tubing 122, and may include a drop-discharge orifice 152. The drop-dispensing body 150 may be configured to discharge a demanded drop 160 of lubricant within a selected drip time upon opening of a lubricant-control valve 130 (discussed below). The drop-dispensing body 150 may comprise a length of tubing or other suitable conduit configured to place the drop-discharge orifice 152 in a suitable location. The drop-dispensing body 150 may comprise a valve such as a needle valve 140 fluidly connected to the lubricant outlet 120 and the drop-discharge orifice 150 and adjustable to permit a drop of oil to be discharged from drop-dispensing body 150 within the selected drip time following opening of the lubricant-control valve 130. A selected drip time of approximately 10 seconds may be suitable in certain applications; longer or shorter selected drip times may be suitable in other applications.

A sealable drip chamber 170 may comprise a drip-chamber base 172. A cover portion 174 may be sealingly attached to the drip-chamber base 172. The cover portion 174 may be partially or entirely translucent or transparent to permit light transmission as necessary for the operation of a light-based drop detector 200 (described below). A pressurized-gas inlet 176 may be provided within the sealable drip chamber 170 for admitting a pressurized gas 180 (and in particular a moving stream thereof), to which lubricant is to be added, into the sealable drip chamber 170. A lubricated-gas outlet 178 may permit lubricated pressurized gas 182 (and in particular a moving stream thereof) to flow from within the sealable drip chamber 170 to outside of the sealable drip chamber. The lubricated pressurized gas 182 flows into a gas mixer such as a venturi 270 or other narrowed passage, or other gas-mixing device, to mix the lubricated pressurized gas with the principal stream 302 of compressed gas, which is the stream of compressed gas to be lubricated. The gas mixer may be located in a lower base 175; the lower base 175, and the restricted passage or venturi 270, may be components of a prior lubrication device—for example, a prior lubrication device of the type shown in FIG. 1. The components of the presently described lubrication system thus may be retrofitted onto the prior lubrication device, and may utilize the compressed-gas inlet 14, the compressed-gas outlet 16, the oil-drip tube 18, the restricted passage 20 between the inlet and the outlet, and the oil-drip passage 22. The presently described lubrication system may also be supplied as an independent installation including a combination of the elements shown in FIGS. 2-7B, without utilizing a prior device.

Figure 5:
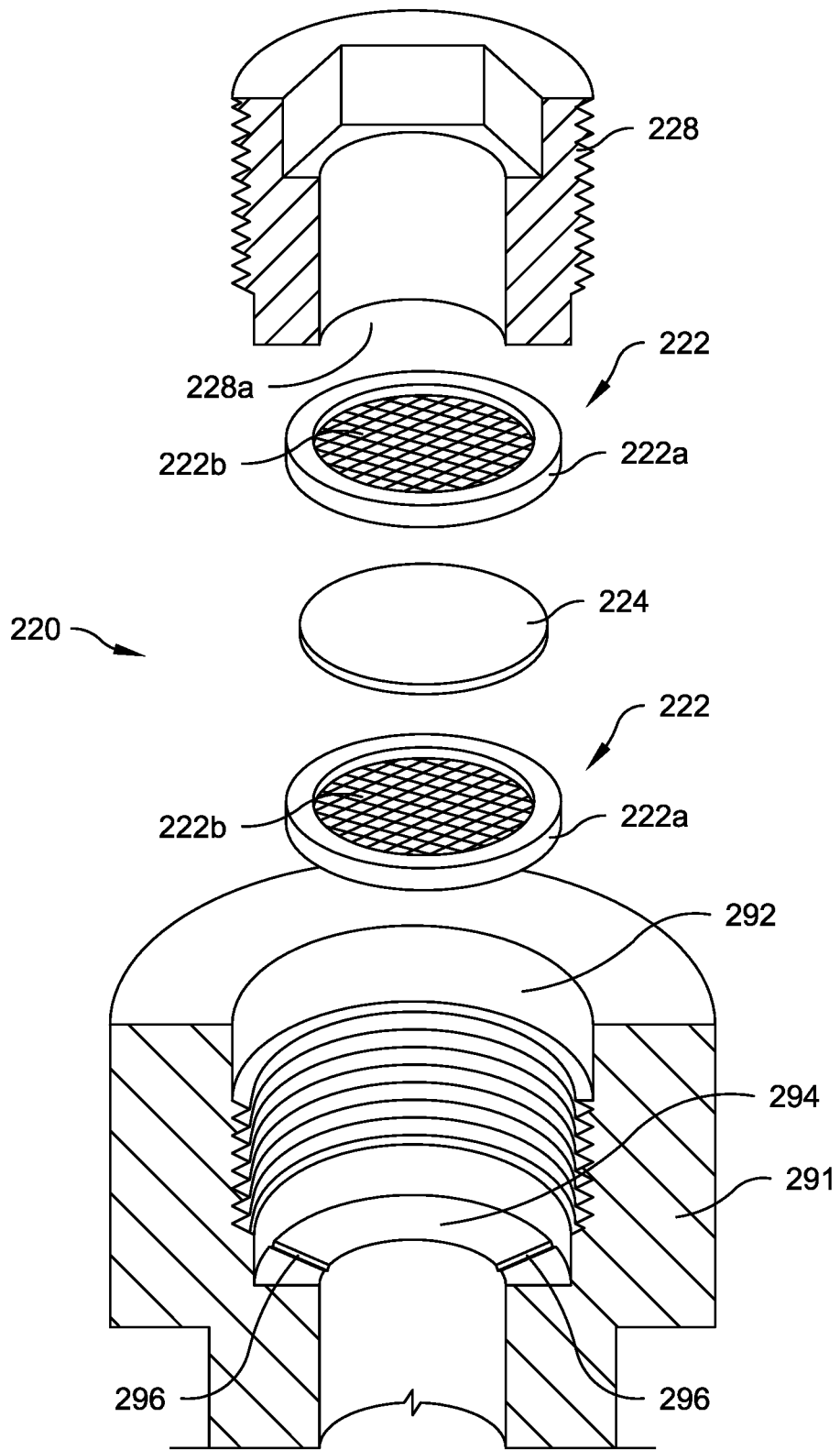
FIG. 5 is an exploded, partially cutaway perspective view of a lubricator-pad assembly for use in a lubrication system of the type shown in FIG. 2, or with the components shown in FIG. 3A.

Referring to FIGS. 2 and 5, a lubricator-pad assembly 220 may be provided to introduce lubricant into the pressurized gas 180. The lubricator-pad assembly 220 may comprise a lubricator-pad holder 222 and a lubricator pad 224 (FIG. 5) held by the lubricator-pad holder 222. The lubricator pad 224 may be a portion of absorbent material such as cotton, fabric material (cotton or other material), or other suitable absorbent material and capable of passing compressed gas therethrough, a portion thereof being selected and sized to hold a drop of oil from the drop-dispensing body 150. The lubricator-pad holder 222 may have a first lubricator-pad orifice, which may be surrounded by a frame 222b and covered by a screen 222a secured by the frame 222b, and a second lubricator-pad orifice, which may likewise be surrounded by a frame 222b and covered by a screen 222a secured by the frame 222b. The two frames 222b may be secured in a stacked arrangement with the lubricator pad 224 between the two frames 222b to form the lubricator-pad holder 222. The orifices and screens (where present) in combination may provide the lubricator-pad holder 222 with a gas path therethrough. The lubricator-pad holder 222 may be secured in a base 291. A set screw 228 with a central aperture 228a may threadedly engage the base 291, which in turn may be sealingly disposed in the drip-chamber base 172. The base 291 may include a bore 292 with a shoulder 294 for supporting the lubricator-pad holder 222. The shoulder 294 may include indentations or surface relief such as grooves 294, which may guide any lubricant reaching the shoulder 294 radially inwardly toward the bore 292. As an alternative to the orifices filled with screens 222a, plates with a plurality of orifices therein may be employed. Depending on the sizes of the orifices therein, such plates may sufficiently secure the lubricator pad 224 without the need for screens. The lubricator-pad holder 222 and the lubricator-pad assembly 220 may be positioned between the pressurized-gas inlet 176 and the lubricated-gas outlet 178 such that pressurized gas flows from the pressurized-gas inlet 176 through the lubricator-pad holder 222 and the lubricator pad 224 when exiting the sealable drip chamber 170 through the lubricated-gas outlet 178. By this arrangement, lubricant from the lubricator pad 224 is vaporized, atomized, or otherwise incorporated into the flow of pressurized gas 182 (FIG. 2) exiting the sealable drip chamber 170.

Referring again to FIG. 2, the drop-discharge orifice 152 of the drop-dispensing body 150 may be disposed within the sealable drip chamber 170, and the lubricator-pad assembly 220 may be disposed to receive the demanded drop 160 of lubricant discharged from the drop-discharge orifice 152. A contoured surface 171 of the sealable drip chamber 170 may be configured to guide the demanded drop 160 of lubricant to the lubricator-pad assembly 220. The contoured surface 171 may have a shape of a funnel (as shown in FIG. 2) or a concave bowl shape, or another suitable shape or combination thereof capable of guiding (including assisting in guiding) the demanded drop 160 of lubricant to the lubricator-pad assembly 220.

An isolation valve 230 may be disposed to block or permit flow through the lubricator-pad 220 assembly between a space within the sealable drip chamber 170 and a space outside of the sealable drip chamber 170. The isolation valve 230 may be a normally-open solenoid and may be activated to block flow through the lubricator-pad assembly 220 between the space within the sealable drip chamber 170 and the space outside of the sealable drip chamber 170 for a selected period of time—for example, for 20 seconds—to allow the atmosphere in the sealable drip chamber 170 to stabilize so that the demanded drop of lubricant 160 may be released and detected more reliably.

Continuing to refer to FIG. 2, a flow-restriction valve 270 may be operable to control a flow rate of the pressurized gas 180 entering into the sealable drip chamber 170 through the pressurized-gas inlet 176.

A drop detector 200 may be provided and may be configured to detect the demanded drop of lubricant from the drop-discharge orifice. The drop detector 200 may comprise a light receiver 202 and a light source 204 detectable by the light receiver 202 and operatively connected so that the drop detector 200 may detect the demanded drop 160 of lubricant, with the light receiver 202 detecting interruption of the light source 204 by the demanded drop 160 of lubricant. (An alternative drop detector might detect the demanded drop 160 of lubricant in another fashion, such as by receiving the drop on a pressure-sensitive pad.) The light source 204 and the light receiver 202 may be mounted or incorporated into a detector ring 210. Various embodiments of the detector ring 210 (FIG. 2), 1210 (FIG. 3A), 1410 (FIGS. 7A, 7B) are disclosed for use in a lubrication system according to the present disclosure.

Referring to FIG. 2, the detector ring contains the light source 204 and the light receiver 202, which are mounted therein in alignment, and diametrically opposite one another, so that light transmitted by the light source 204 may be received by the light receiver 202. The light ring 210 may be adjustable so that the light detector 200 may be aligned to detect the demanded drop 160 of lubricant upon the falling thereof from the drop-discharge orifice 152.

Referring to FIGS. 3A-3C, the detector ring 1210 may rest and may be secured atop a drip-chamber base 1272 and may surround a cover 1274, which in turn encloses a drop-dispensing body 1250 for dispending a demanded drop 1260 of lubricant. A lid 1211 may fit atop the detector ring 1210 and may be secured thereto by screws or other suitable fasteners. The detector ring 1210 may be able to be rotated about the drip-chamber base 1272 and may be secured thereto by clamp blocks 700. Each clamp block 700 may have a first step 702 and a second step 704 to conform the clamp block to the drip-chamber base 1272. Each clamp block 700 may have a hole 706 aligned in use with a hole 1206 of the detector ring, and screws passing through the aligned holes 1206, 706 may provide a mechanism for securing the detector ring 1210 to the drip-chamber base 1272. The detector ring 1210 may include drip-detector holes 1202a and 1202b, which may be sized and aligned for accommodating the light source 204 and the light receiver 202 of a detector 200 (FIG. 2), as described above. A lubricator-pad assembly 1222 is positioned within the drip-chamber base 1272 such that pressurized gas flows through the lubricator-pad assembly 1222, as described above with respect to the lubricator-pad assembly 220. As shown in FIG. 3A the lubricator-pad assembly 1222 may be positioned below the clamp blocks 700 to avoid damage from tightening of the clamp blocks. A polycarbonate nipple 1276 may be provided to allow an operator to observe the flow 1278 of lubricated gas exiting the lubricator-pad assembly 222. An isolation valve 1230 may be provided and functions as described for the isolation valve 230. Finally, an insulating nipple 1270a, made of polycarbonate or another material of suitable strength and insulating properties, may be provided to maintain some lever of thermal isolation between the lower base 1270 and the remaining components shown in FIG. 1270. The lower base 1270 may be formed from aluminum and may include a venturi or other gas mixer for mixing the flow 1278 of lubricated gas with a stream of compressed gas to be lubricated, as described herein.

Figure 7A:
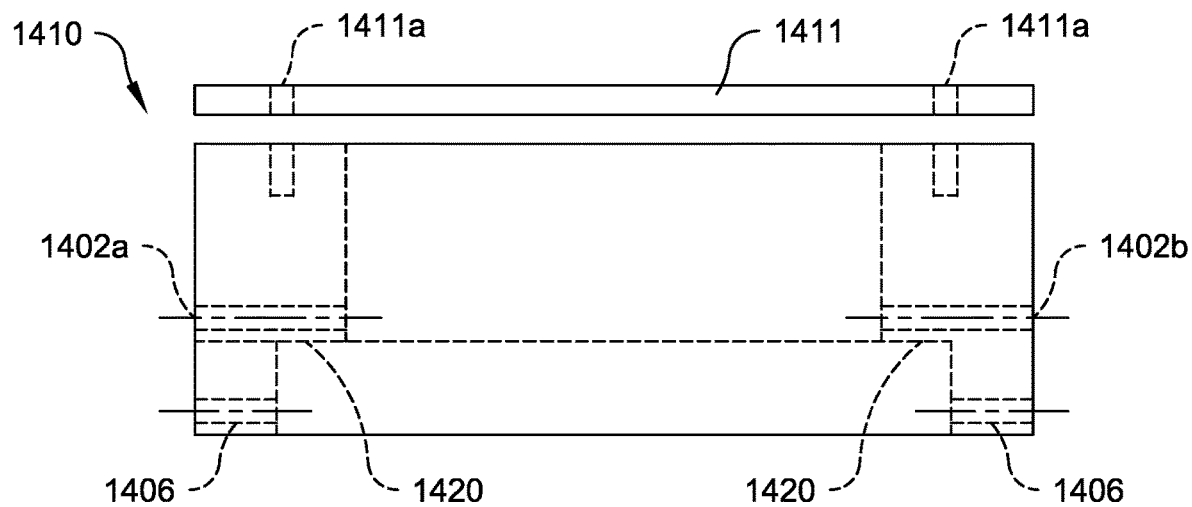
FIG. 7A is a front elevational partial exploded view of a sensor ring for use in a lubrication system of the type shown in FIG. 2.
Figure 7B:
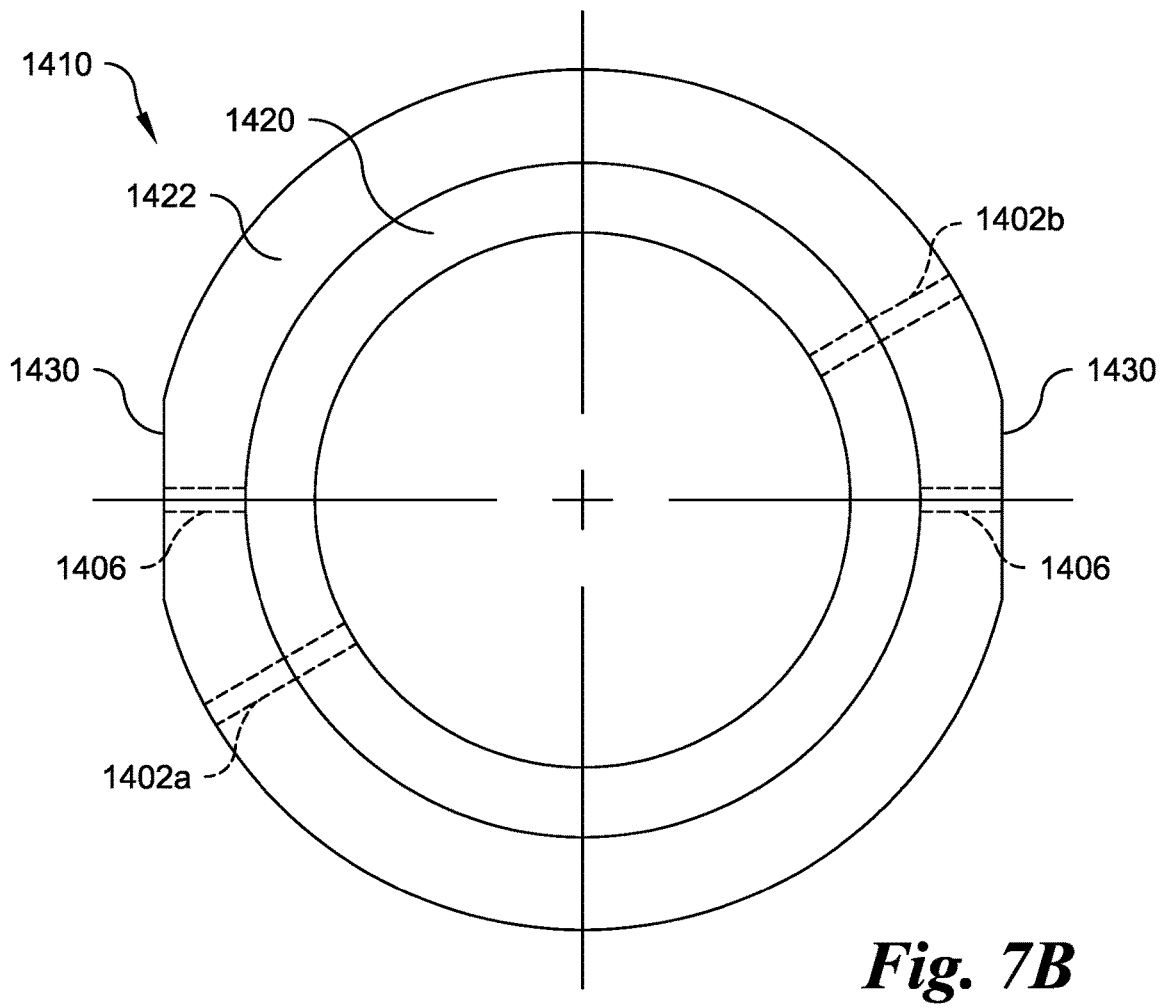
FIG. 7B is a bottom plan view of the sensor ring of FIG. 7A.

Referring to FIGS. 7A and 7B, a second embodiment of the detector ring 1410 may be configured to rest and be secured atop a drip-chamber base of the same general shape as the drip-chamber base 1272. A lid 1411 may fit atop the detector ring 1410 and may be secured thereto by screws or other suitable fasteners passing through holes 1411a. The detector ring 1410 may have an interior step 1420 for accommodating a particular drip-chamber base and an lower step 1422 servicing as a lower support surface for the detector ring 1410. The detector ring 1410 may also include holes 1406 for accepting set screws or screws used in conjunction with a clamp, as described above with respect to the clamp 700. The detector ring 1410 may also include drip-detector holes 1402a, 1402b, which may be sized and aligned for accommodating the light source 204 and the light receiver 202 of a detector 200 (FIG. 2), as described above. The detector ring may have flat exterior surfaces 1430 to aid in the securement of a clamping device such as the clamp blocks 700 described above.

Any embodiment of the detector ring 210, 1210, 1410 may include a one or more viewing apertures (not shown) to allow an operator to direct a light into and to observe operation of the sealable chamber 170 with the detector ring in place. The viewing apertures may be sealable with plugs, covers, or the like when not in use.

Referring again to FIG. 2, the lubricant-control valve 130 may take the form of a normally-closed solenoid valve, may be disposed between the sealable lubricant vessel 100 and the drop-discharge orifice 152 and may be controllable to block or permit flow between the sealable lubricant vessel 100 and the drop-discharge orifice 152. A safety valve 132 may be provided between the lubricant-control valve 130 and the sealable lubricant vessel 100 to isolate the sealable lubricant vessel 100, and in particular the lubricant vessel 100, for filling or other maintenance of the lubricant vessel 100. The safety valve 132 may preferably be a manually actuated valve and may preferably be located in close proximity to the lubricant-control valve 130 and upstream thereof to avoid discharging lubricant as a result of opening and closing of the safety valve 132.

Figure 4:
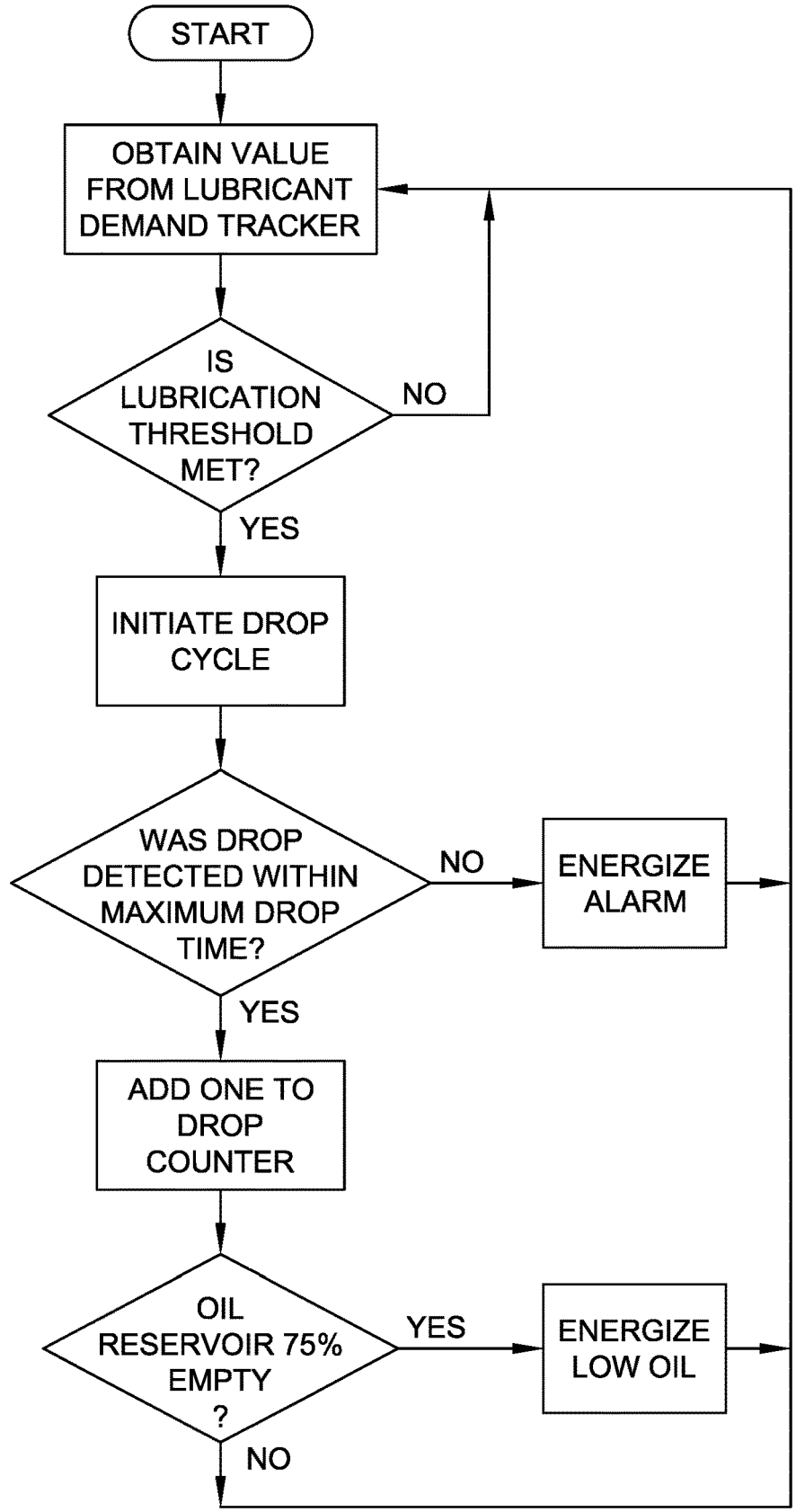
FIG. 4 is flow chart showing an example of steps in the control and operation of the system of FIG. 2.

A controller 250 may be operatively connected to the drop detector (light receiver 202 and light source 204, as shown) so that when the drop detector detects the demanded drop 160 of lubricant, the controller 250 may receive an indication that the demanded drop 160 of lubricant has been detected. The controller 250 may be a programmable logic controller (PLC), a microprocessor, or any other device capable of receiving and evaluating inputs and providing outputs based on programming or configuration thereof. The controller 250 may include one or more timers, storage locations, processors as needed to perform the functions described herein. The controller 250 may be operatively connected to the lubricant-control valve 130 so that the controller 250 controls the opening and closing of the lubricant-control valve 130. (The lubricant-control valve 130 may also be operable by a manual activation switch for testing and setup.) The controller 250 may be operatively connected to the isolation valve 230 so that the controller 250 controls the opening and closing of the isolation valve 230. The controller 250 may include a lubrication-demand tracker, which may be a timer, counter, calculated table, lookup-table entry, or the like that provides a value correlated with a demand for lubrication. Upon the controller 250 determining that the lubrication-demand tracker has reached a lubrication threshold, the controller 250 initiates a drop cycle, wherein in the drop cycle the controller 250 first causes the isolation valve 230 to be closed for a settling time. The settling time may be either a selected elapsed time or may be the time at which a measured pressure reaches or settles at a desired value or range, as measured by an air-pressure sensor 240 (which may be, for example, a commercially pressure sensor operating on electric power at 5V). The controller 250 then causes the lubricant-control valve 130 to open and permit flow until one of a first event and a second event occurs, wherein the first event is a detection of the demanded drop 160 of lubricant by the drop detector, and the second event is a passage of a maximum drop time, the maximum drop time being greater than or equal to the selected drop time of the drop-dispensing body 150. If the passage of the maximum drop time is completed before the demanded drop 160 of lubricant is detected, the controller 250 activates a missing-drop cycle. The controller 250 may maintain a count of missing-drop cycles and upon a sufficient number of missing-drop cycles may initiate a sensor-check indicator to alert operators to a potential issue with the drop sensor 200, or the controller 250 may initiate another action is response to the missing-drop cycles. The missing-drop cycle may include setting of a missing-drop indicator, initiating a display of a missing-drop visual indicator (such as a light or a message on a display screen), sounding of a missing-drop audio indicator, sending an electronic message such as a text message or e-mail, or other action as desired. If the demanded drop of lubricant is detected prior to passage of the maximum drop time, a drop counter may be incremented, and the isolation valve 230 may be closed. In embodiments in which the drop counter is being incremented, the controller 250 may compare the drop counter to a lubricant-refill threshold and may, upon the drop counter reaching a specified number of drops since the most recent refill of lubricant, activate a lubricant-refill indicator such as light source, an alarm, or the like. A simplified example of a flow chart of the logical operation of the controller is shown in FIG. 4.

The lubrication system may include a gas-flow meter 260 disposed to measure a measured flow characteristic of at least a portion of a flow of pressurized gas requiring lubrication. The lubricant-demand tracker of the controller 250 may include a gas-flow tracker determining a cumulative quantity of the flow of pressurized gas requiring lubrication since a resetting of the gas-flow tracker. The cumulative quantity of the flow of pressurized gas requiring lubrication may be determined based on at least one of an elapsed time since the resetting of the gas-flow tracker, and the measured flow characteristic. For example, the gas-flow meter may be a commercially available mass-airflow sensor, and the cumulative quantity of the flow of pressurized gas requiring lubrication may be computed based on a sensed rate of air flow and a length of time in which the sensed rate of air flow has been measured. Alternatively, the gas-flow tracker may determine demand for lubricant based upon elapsed time alone, or upon an amount of elapsed time with the measured flow characteristic being consistent with a nonzero flow of pressurized gas. Upon the controller 250 determining that the cumulative quantity of the flow of gas requiring lubrication has reached the lubrication threshold (where such lubrication threshold has been defined in terms of a cumulative quantity of pressurized gas requiring lubrication), or determining that the lubrication-demand tracker has reached any lubrication threshold, the controller 250 may execute a drop cycle.

Figure 6B:
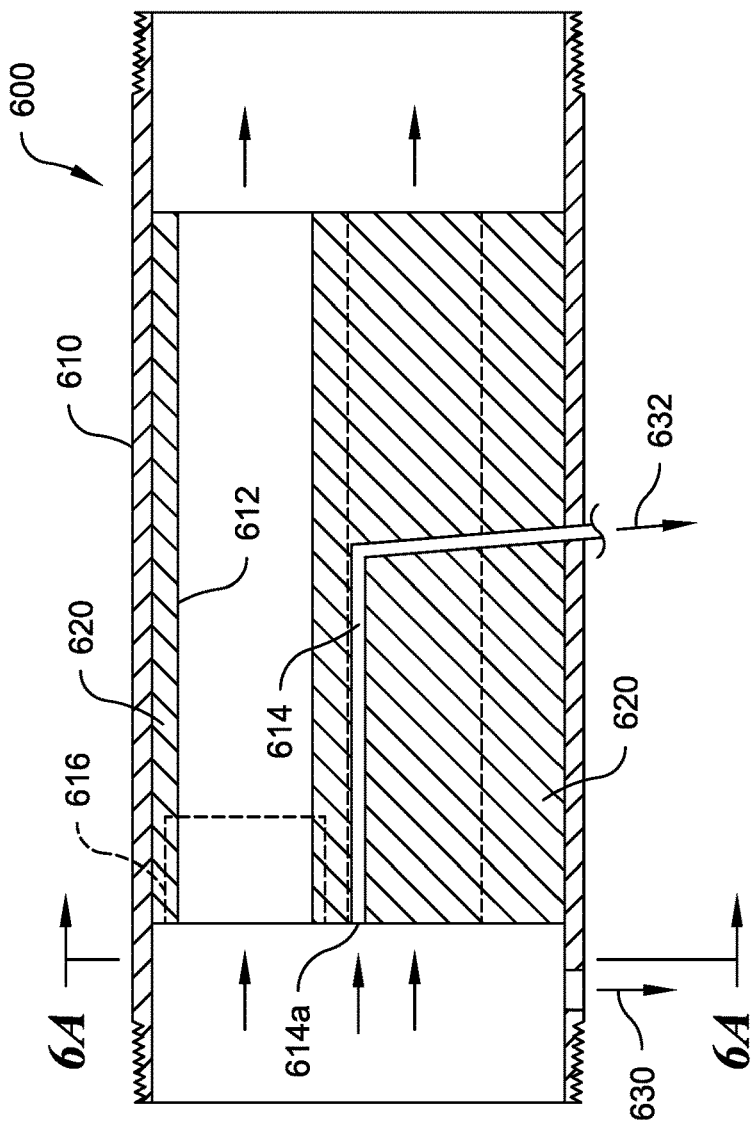
FIG. 6B is a longitudinal sectional view of the metering tube of FIG. 6A.
Figure 6A:
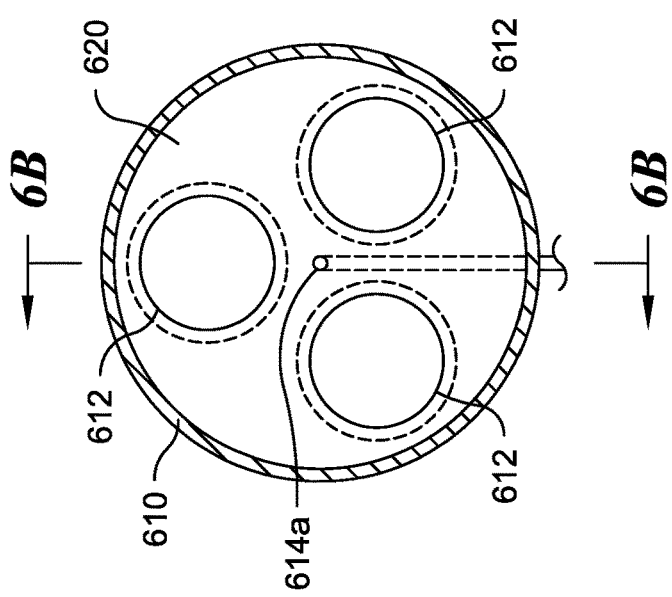
FIG. 6A is a transverse sectional view of a flow-measurement device in the form of a metering tube for use in a lubrication system as disclosed herein.

Referring to FIGS. 6A and 6B, the gas-flow meter 260 may comprise a metering tube 600, which in turn may comprise a cylindrical substate 610 having a plurality of flow-carrying bores 612 passing longitudinally through a solid unbored portion 620 thereof. A tubular dynamic-pressure port in the form of dynamic-pressure tube 614 may have a dynamic-pressure inlet 614a facing substantially in an upstream direction with respect to gas flow, and a static-pressure port 630 may face substantially transversely with respect to gas flow. Pressures measured using the dynamic-pressure tube 614 and the static-pressure port 630 may be used, in conjunction with time or other factors, to calculate or otherwise determine (as by a lookup table) gas flow, other gas characteristics, or demand for lubricant. A flow-restricting body may be securable in at least one of the flow-carrying bores 612 to restrict flow therethrough. The flow-restricting body may be a set screw 228 of the type shown in FIG. 5 with an axial bore 228a therethrough; alternatively, the flow-restricting body may be a plug, a cap, or other body capable of blocking all or a portion of the flow-carrying bore 612 to be restricted. One or more flow-restricting bodies may be employed as desired to restrict the area available for flow through the metering tube 600.

Referring to FIG. 2, the lubrication system may include a heater 290 or a heater 290b disposed to prevent ice formation within the sealable drip chamber 170. The heater 290, 290b may be particularly needed in environments where the ambient temperature may drop below 50° F. (10° C.) and may be set to maintain a desired temperature range, such as about 65° to 70° F. (about 18° C. to 21° C.). The heater 290 may have a capacity of about 15 watts. The heater 290 may be provided near the lubricated-gas outlet 180, or the heater 290b may be positioned to heat the pressurized gas 180 before the pressurized gas 180 enters the sealable drip chamber 170, or the heater 290 may be incorporated into the detector ring 210. The heaters 290, 290b may be combined in one system, as shown in FIG. 2.

In the embodiment shown in FIG. 2, the compressed gas source for the entire system is the manifold 300. This arrangement results in compressed gas of essentially equal pressure to be provided to the lubricant reservoir 100, the diverted-regulated-air intake 310, and the principal stream 302, which flows through the meter 260 and the gas mixer/venturi 270.

A lubrication system as described herein may provide monitoring of each demanded drop 160 of lubricant that is delivered (or attempted to be delivered) by the controller. In contrast, with prior lubrication systems, it is not practical to have an operator constantly monitor the delivery of lubricant. As a result, prior lubrication systems can permit a pneumatic machine to run without lubrication if the lubrication system fails, or if the lubrication system consumes all lubricant in the lubricant reservoir, and thus becomes ineffective for delivering lubricant. A lubrication system as described herein may provide an immediate indication of inadequate lubrication, preventing the consequences of long-term operation of pneumatic machines with inadequate lubrication (or entirely without lubrication). Moreover, a lubrication system as described herein can provide precise metering of lubricant delivered in response to lubrication demand, thus reducing both under-lubrication and over-lubrication of pneumatic machinery.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present disclosure as defined by the appended claims.

I claim:

1. A lubrication system for pneumatic machinery, comprising:
a sealable lubricant vessel having a lubricant outlet, the sealable lubricant vessel being operatively connected to at least one pressurizing valve passage operable to admit pressurized gas into the sealable lubricant vessel and to block pressurized gas from passing into the sealable lubricant vessel, and the sealable lubricant vessel being operatively connected to at least one depressurizing valve passage operable to release pressurized gas from the sealable lubricant vessel;
a drop-dispensing body fluidly connected to the lubricant outlet and having a drop-discharge orifice, wherein the drop-dispensing body is configured to discharge a demanded drop of lubricant within a selected drip time;
a sealable drip chamber comprising a drip-chamber base, a cover portion sealingly attached to the drip-chamber base, a pressurized-gas inlet within the sealable drip chamber for admitting pressurized gas into the sealable drip chamber, and a lubricated-gas outlet permitting lubricated pressurized gas to flow from within the sealable drip chamber to outside of the sealable drip chamber;
a lubricator-pad assembly comprising a lubricator-pad holder and a lubricator pad secured by the lubricator-pad holder, wherein the lubricator-pad holder has a first lubricator-pad orifice and a second lubricator-pad orifice providing a gas-flow path through the lubricator-pad holder, and wherein the lubricator-pad holder is positioned between the pressurized-gas inlet and the lubricated-gas outlet such that pressurized gas flows from the pressurized-gas inlet through the first lubricator-pad orifice and through the second lubricator-pad orifice when exiting the sealable drip chamber through the lubricated-gas outlet, wherein the drop-discharge orifice of the drop-dispensing body is disposed within the sealable drip chamber, and the lubricator-pad assembly is disposed to receive the demanded drop of lubricant discharged from the discharge orifice;
a drop detector configured to detect the demanded drop of lubricant from the drop-discharge orifice;
a lubricant-control valve disposed between the sealable lubricant vessel and the drop-discharge orifice and controllable to block or permit flow between the sealable lubricant vessel and the drop-discharge orifice;
an isolation valve disposed to block or permit flow between a space within the sealable drip chamber and a space outside of the sealable drip chamber;
a controller operatively connected to the drop detector so that when the drop detector detects the demanded drop of lubricant, the controller receives an indication that the demanded drop of lubricant has been detected,
wherein the controller is operatively connected to the lubricant-control valve so that the controller controls opening and closing of the lubricant-control valve,
wherein the controller is operatively connected to the isolation valve so that the controller controls opening and closing of the isolation valve,
wherein the controller includes a lubrication-demand tracker, and
wherein, upon the controller determining that the lubrication-demand tracker has reached a lubrication threshold, the controller initiates a drop cycle, wherein in the drop cycle the controller first causes the isolation valve to be closed for a settling time, and the controller then causes the lubricant-control valve to permit flow until one of a first event or a second event occurs, wherein the first event is a detection of the demanded drop of lubricant by the drop detector, and the second event is a passage of a maximum drop time, the maximum drop time being greater than or equal to the selected drip time of the drop-dispensing body,
wherein if the passage of the maximum drop time is completed before the demanded drop of lubricant is detected, the controller activates a missing-drop cycle.

2. The lubrication system according to claim 1, wherein a single valve comprises the at least one pressurizing valve passage and the at least one depressurizing valve passage operable to release gas pressure from the lubricant vessel.

3. The lubrication system according to claim 1, wherein the drop-dispensing body comprises a valve fluidly connected to the lubricant outlet and to the drop-discharge orifice and adjustable to permit a drop of oil to be discharged from drop-dispensing body within the selected drip time upon opening of the lubricant-control valve.

4. The lubrication system according to claim 1, wherein a contoured surface of the sealable drip chamber is configured to guide the demanded drop of lubricant to the lubricator-pad assembly.

5. The lubrication system according to claim 1, wherein the contoured surface of the sealable drip chamber has a funnel shape.

6. The lubrication system according to claim 1, wherein the drop detector comprises a light receiver and a light source detectable by the light receiver, wherein the drop detector detects the demanded drop of lubricant by detecting interruption of the light source.

7. The lubrication system according to claim 1, wherein if the demanded drop of lubricant is detected within the maximum drop time, a drop counter is incremented and the isolation valve is closed.

8. The lubrication system according to claim 1, further comprising a gas-flow meter disposed to measure a measured flow characteristic of at least a portion of a flow of pressurized gas requiring lubrication,
   wherein the controller includes a gas-flow tracker determining a cumulative quantity of the flow of pressurized gas requiring lubrication since a resetting of the gas-flow tracker and wherein the cumulative quantity of the flow of pressurized gas requiring lubrication is determined based on at least one of an elapsed time since the resetting of the gas-flow tracker and the measured flow characteristic,
   wherein, upon the controller determining that the cumulative quantity of the flow of gas requiring lubrication has reached a lubrication threshold, the controller executes a drop cycle.

9. The lubrication system according to claim 8, wherein the gas-flow meter comprises a metering tube comprising a substrate having a plurality of flow-carrying bores passing longitudinally therethrough, a dynamic pressure port with a dynamic-pressure inlet facing in an upstream direction, and a static-pressure port facing transversely with respect to the upstream direction.

10. The lubrication system according to claim 9, further comprising a flow-restricting body securable to restrict flow through at least one of the flow-carrying bores.

11. The lubrication system according to claim 10, wherein the flow-restricting body is a set screw with an axial bore therethrough.

12. The lubrication system according to claim 1, wherein, upon the controller determining that the drop counter has reached a lubricant-refill threshold, the controller activates a lubricant-refill indicator.

13. The lubrication system according to claim 1, further comprising a heater disposed to prevent ice formation within the sealable drip chamber.

14. The lubrication system according to claim 1, further comprising a flow-restriction valve operable to control a flow rate of pressurized gas entering into the sealable drip chamber through the pressurized-gas inlet.

* * * * *